(No Model.)
W. A. WHITE.
TRELLIS FOR GARDEN CROPS.
No. 334,918. Patented Jan. 26, 1886.
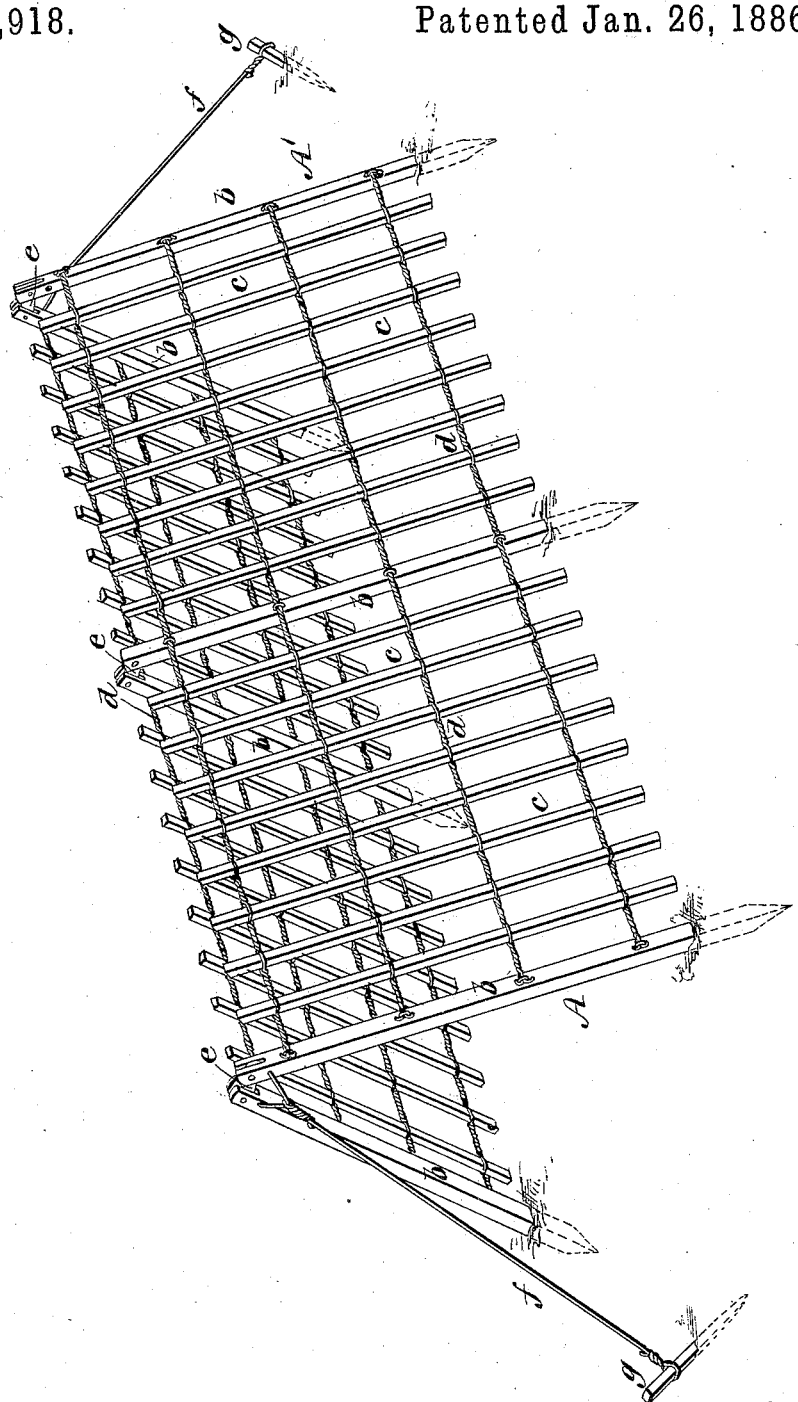
WITNESSES:
INVENTOR:
BY
ATTORNEYS.

United States Patent Office.

WILLIAM ANTONEY WHITE, OF STAATSBURG, NEW YORK.

TRELLIS FOR GARDEN CROPS.

SPECIFICATION forming part of Letters Patent No. 334,918, dated January 26, 1886.

Application filed September 18, 1885. Serial No. 177,450. (No model.)

*To all whom it may concern:*

Be it known that I, WILLIAM A. WHITE, of Staatsburg, in the county of Dutchess and State of New York, have invented a new and Improved Trellis for Garden Crops, &c., of which the following is a full, clear, and exact description.

This invention consists in a portable garden-trellis for peas, beans, tomatoes, and other crops requiring support, substantially as hereinafter described, and pointed out in the claim. The same may also be used for protecting young fruit-trees; but it is mainly designed for garden crops, and is intended as a substitute for pea-brush as now ordinarily employed for supporting peas, beans, &c., and which is not only unsightly, troublesome, makes much dirt or refuse, and occupies much room in storing away for winter, but, lacking durability, is expensive. My specially-constructed trellis obviates all this, saves labor, and may be rolled or folded up and put away for use over and over again.

Reference is to be had to the accompanying drawing, forming part of this specification, in which the figure represents a view in perspective of two sections of my improved trellis as erected or in position for use.

The trellis may be put up in one, two, or any greater number of continuous sections, and may be made either wholly of metal or of wood and metal combined.

A A' indicate two continuous garden-trellis sections composed of independent opposite side frames, that when the trellis is set up incline toward each other in an upward direction and are spread apart at their base. Each of these frames of the trellis is made of pickets *b*, of which there is one at each end, and of bars, rods, or wires *c*, arranged parallel with the pickets, but of less length than the pickets, so that when the trellis is set up and the pickets *b* are driven into the ground the strips *c* will stop short of entering the ground, or nearly so. The pickets and strips *b c* are woven or united with each other on each side of the trellis-sections and suitably spaced from each other by any number of rows of wires or wire ropes, *d*, arranged one above the other. These wires may be fixedly secured to the end pickets of the trellis and the bars or strips *c* be passed through them, as warp through a weft. Said strips *c* may be of either wood or metal, or they might be mere wires; and the pickets *b* may also be made of either wood or metal. Said pickets on the opposite side frames of the trellis are hinged together at their upper ends, as by pivoted links *e*, which serve to hold the opposite side frames of the trellis together and to provide for spreading the lower portion of the double or folding trellis apart, as required, thus bringing the upper ends or edges of the two side frames of the trellis together; also keeps the double or folding trellis intact when storing or packing it away for the winter, and the flexibility of the whole structure permits of the trellis or trellis-sections being folded or rolled up so as to occupy but little space when not required for use.

When the trellis is set up, as shown in the drawing, it may be held as stretched out and be firmly anchored by guy-ropes *f*, attached to the upper ends of the end pickets and secured by stakes *g*, driven into the ground.

In applying the trellis to supporting peas and beans these plants will be inside the double spread trellis; but tomatoes, when supported by it, should be on the outside of both opposite side frames of the trellis.

I am aware that strands of horizontal wires have been interwoven with wooden slats to form a picket fence, and I am also aware that a trellis consisting of inclined bars secured together at their upper ends and horizontal wires secured to said bars is old, and I therefore do not claim such inventions.

Having thus described my invention, what I claim as new, and desire to secure by Letters Patent, is—

In a double and folding trellis for garden and other like crops, the combination of the pickets *b*, the hinges or pivoted links *e*, connecting the upper ends of the pickets in the opposite side frames of the double trellis, the longitudinal wires *d* between the pickets in each side frame and the cross bars or strips *c*, interwoven with said wires, essentially as shown and described.

WILLIAM ANTONEY WHITE.

Witnesses:
CHAS. F. COSSUM,
CASPER L. ODELL.